United States Patent [19]
Ikawa

[11] 3,930,665
[45] Jan. 6, 1976

[54] ENERGY ABSORBING PANEL STRUCTURE
[75] Inventor: Kazuo Ikawa, Yokohama, Japan
[73] Assignee: Nissan Motor Company Limited, Yokohama, Japan
[22] Filed: July 29, 1974
[21] Appl. No.: 492,836

[30] Foreign Application Priority Data
Aug. 24, 1973  Japan.................................. 48-99229

[52] U.S. Cl.................. 280/150 B; 180/90; 293/71
[51] Int. Cl.$^2$.......................................... B60R 21/08
[58] Field of Search .... 280/150 B, 150 AB; 180/90; 293/70, 71, DIG. 3; 188/1 C

[56] References Cited
UNITED STATES PATENTS

| 3,412,628 | 11/1968 | Degain | 293/70 X |
| 3,774,713 | 11/1973 | Stegmaier | 280/150 B X |
| 3,806,154 | 4/1974 | Akiyama | 280/150 B |
| 3,831,705 | 8/1974 | Glance | 280/150 B X |

FOREIGN PATENTS OR APPLICATIONS

| 1,923,305 | 10/1970 | Germany | 293/DIG. 3 |

Primary Examiner—Leo Friaglia
Assistant Examiner—Michael J. Forman

[57] ABSTRACT

Two uniform sheets are separated from each other by a corrugated member. The alternating ridges of the corrugated member are spot-welded to the inner surfaces of the two sheets. One of the sheets forms an impact receiving surface and has rows of slots, each row being located between the ridges. Upon impact, the slotted sheet is fractured and the adjoining spot-welded sections of the corrugated member are progressively deformed to distribute the impact force over a large area.

8 Claims, 2 Drawing Figures

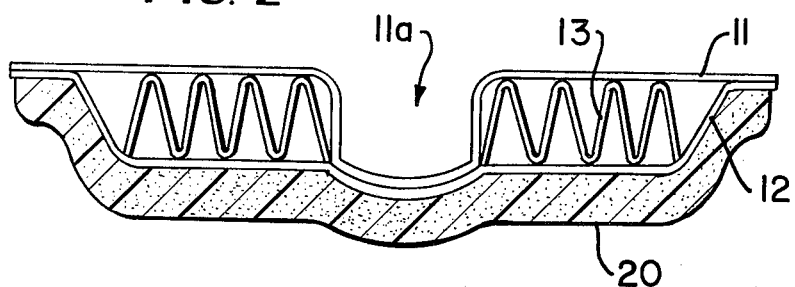
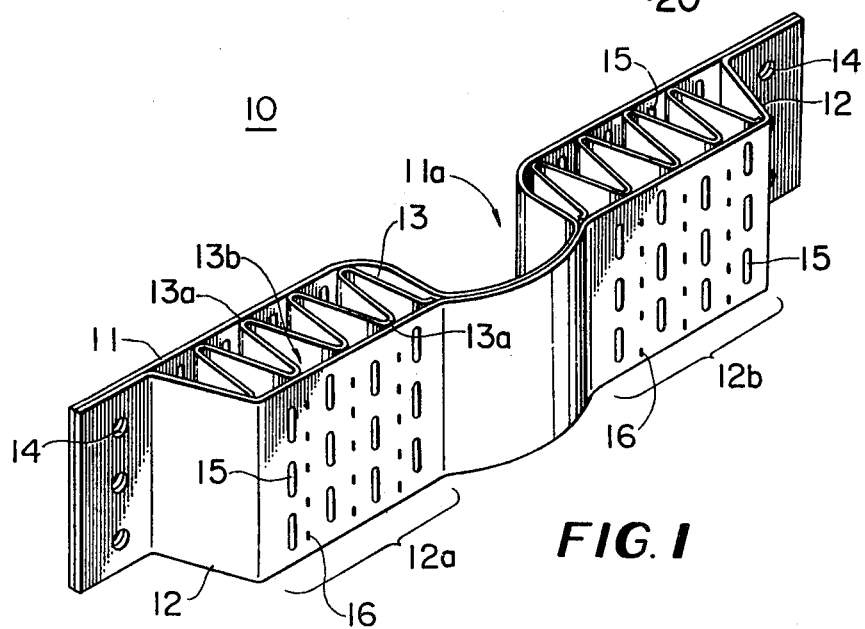

ENERGY ABSORBING PANEL STRUCTURE

This invention relates to an energy absorbing panel structure for protecting passengers of vehicles in collisions of automobiles, aircraft, and like means of transportation, the panel structure serving to absorb the kinetic energy of an occupant of the vehicle to protect him from serious injury.

The construction of this invention features the use of a corrugated metal structure sandwiched between two sheets of metal, at least one of which is perforated to serve as an energy absorbing member as it fractures upon impact and the corrugated member acting as another energy absorbing member as it deforms subsequently by the impact.

It is expected to utilize this invention on the lower portion of the steering column of an automobile or like vehicle as well as on the instrument panel. It is further expected to use this panel structure at various locations of the vehicle to protect also the passengers in the rear portion of the vehicle.

The invention will become apparent as the following description proceeds when taken in conjunction with the accompanying drawings in which:

FIG. 1 is a perspective view of the energy absorging panel structure of the invention; and FIG. 2 is plan view of the structure with a pad applied to the surface thereof.

In FIG. 1, the impact energy absorbing panel structure of the invention is generally indicated at reference numeral 10 and includes first and second elongated thin steel sheets 11 and 12 in generally spaced relationship to each other and a third or corrugated or wavy thin steel sheet 13 interposed therebetween, as illustrated. The sheets 11 and 12 are bent in a generally U-shaped section 11a transverse to the length of the panel structure 10 at the intermediate portion thereof through which the steering column of an automobile will extend. At the opposite ends of the sheets 11 and 12 there are provided apertures 14 through which screws (not shown) secure the panel structure 10 to any position underneath the steering column. Intermediate sections 12a and 12b of the sheet 12 are spaced from the sheet 11 for accommodation of the corrugated sheet 13 with its alternating ridges 13a being preferably spot-welded as at 16 to the inner surfaces of the sheets 11 and 12. In the illustration both sheets 11 and 12 are further provided with rows of serially arranged slots 15, the rows extending in a direction transverse to the length of the panel structure 10 between the alternating grooves 13b of the corrugated sheet 13.

The intermediate sections 12a and 12b form impact receiving surfaces and the slots 15 provide for a weakening of resistance to fracture of sheet 12. Upon impact of the knee of a vehicle passenger with the panel structure 10, fracture or shearing of the sheet 12 readily occurs along the rows of slots 15. Subsequently, deformation of the corrugated sheet 13 occurs. For example, a knee hitting the panel structure 10 would cause a progressive deformation of adjoining spot-welded sections. The impact forces are thus distributed over a large area reducing the force of impact at any particular point.

It is obvious that any number of slots 15 may be formed in the sheet 12. Preferably, a sufficient number of slots 15 and ridges 13a should be formed to provide selective weakening of the panel structure 10.

The panel structure as constructed and shown in the drawing may be secured in position underneath the steering column to a structural member of the passenger compartment of the vehicle by means of, for example, screws and brackets.

The bend 11a can obviously be dispensed with to form a pair of spaced, uniform sheets with the corrugated member interposed therebetween. This construction will allow the panel structure to be adapted to various portions of the vehicle, such as on the instrument panel, the rear side of the front seat, or on the inner walls of the door panels.

The panel structure 10 may preferably be provided on the impact receiving surface with a resilient padding 20 as shown in FIG. 2, such as foam rubber, to provide a further cushioning effect to the impact force.

What is claimed is:

1. Restraining means for restraining forward movement of a vehicle occupant arising from a sudden deceleration of the vehicle, comprising a first sheet of metal secured to a structural member of the passenger compartment of said vehicle, a second sheet of metal secured at the opposite ends thereof in spaced relationship to said first sheet of metal forming an impact receiving surface, and a third sheet of metal folded into a meandering shape and supported by the inner sides of said first and second sheets with the folded portions connected with said inner sides, said second sheet having rows of apertures, each row being arranged between the adjacent folded portions, whereby upon receipt of an impact force said second sheet is fractured along said rows so that part of the kinetic energy of said vehicle occupant is absorbed and said third sheet is flexured subsequently to absorb the remainder of said kinetic energy.

2. Restraining means as claimed in claim 1, wherein said apertures are slots extending along said rows.

3. Restraining means as claimed in claim 1, further comprising a resilient padding on said impact receiving surface.

4. A knee restraint for limiting the forward movement of a vehicle occupant arising from a sudden deceleration of a vehicle, comprising a first sheet of metal secured at the opposite ends thereof to structural members of the passenger compartment of said vehicle in a position to engage the knee portion of said occupant under sudden deceleration of the vehicle, a second sheet of metal secured at the opposite ends thereof in spaced relation to said first sheet of metal forming an impact receiving surface, and a third sheet of metal folded into a meandering shape and supported by the inner sides of said first and second sheets with the folded portions connected with said inner sides, said second sheet having rows of apertures, each row being arranged between the adjacent folded portions, whereby upon receipt of an impact force said second sheet of metal is fractured along said rows so that part of the kinetic energy of said vehicle occupant is absorbed and said third sheet of metal is flexured subsequently to absorb the remainder of said kinetic energy.

5. A knee restraint as claimed in claim 4, wherein said apertures are slots extending along said rows.

6. A knee restraint as claimed in claim 4, further comprising a resilient padding on said impact receiving surface.

7. A knee restraint as claimed in claim 4, wherein said first and second sheets have the intermediate portion thereof bent to form a generally U-shaped groove transverse to the length.

8. A knee restraint as claimed in claim 7, wherein said first and second sheets are positioned so that the steering column of said vehicle extends through said U-shaped groove.

* * * * *